Figure 1:
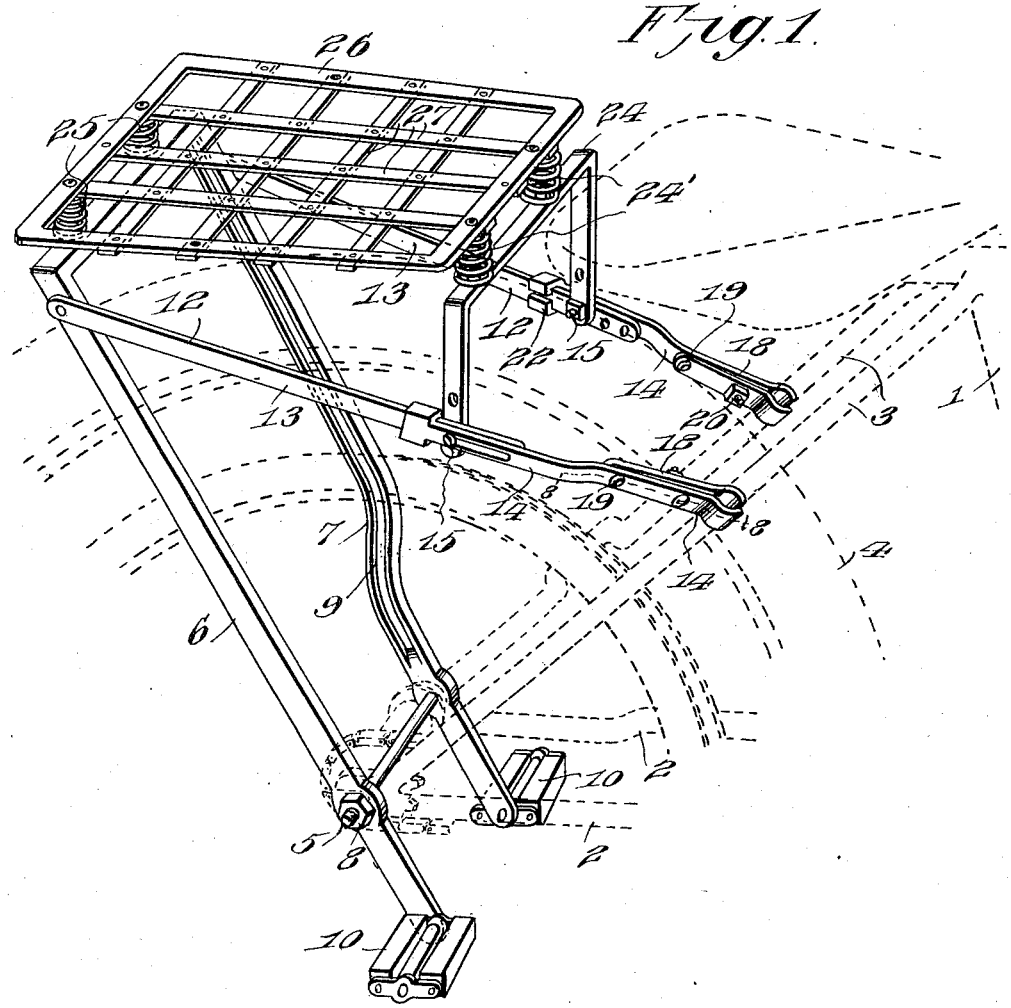

B. L. HOWELL.
BICYCLE ATTACHMENT.
APPLICATION FILED SEPT. 12, 1911.

1,030,844.

Patented June 25, 1912.
2 SHEETS—SHEET 1.

Witnesses
Frank Hough

Inventor
Bert L. Howell,
By Victor J. Evans
Attorney

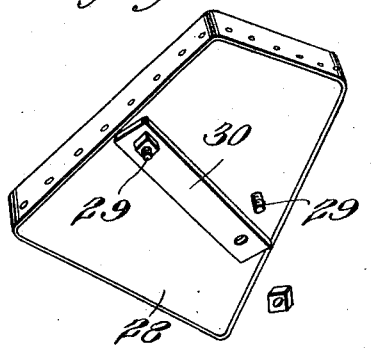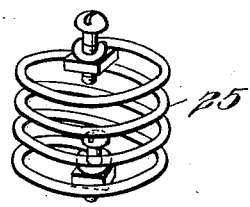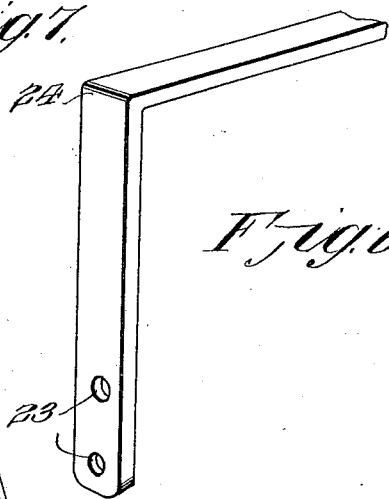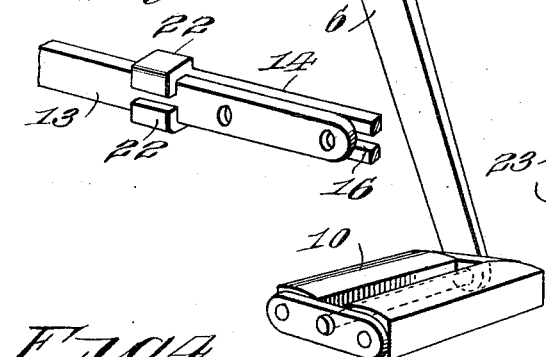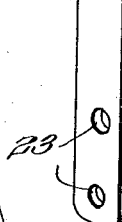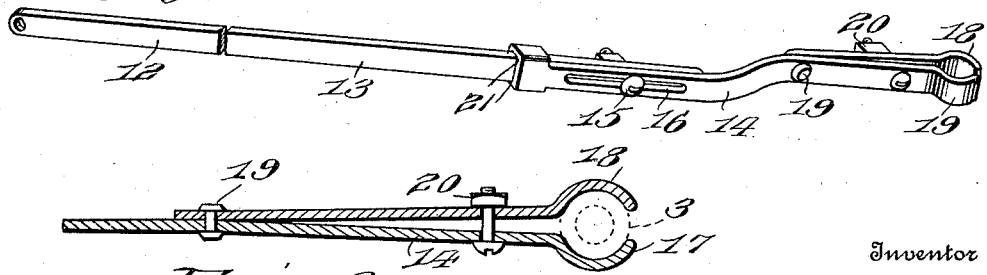

UNITED STATES PATENT OFFICE.

BERT L. HOWELL, OF DANVILLE, ILLINOIS.

BICYCLE ATTACHMENT.

1,030,844.   Specification of Letters Patent.   Patented June 25, 1912.

Application filed September 12, 1911. Serial No. 648,833.

*To all whom it may concern:*

Be it known that I, BERT L. HOWELL, a citizen of the United States, residing at Danville, in the county of Vermilion and State of Illinois, have invented new and useful Improvements in Bicycle Attachments, of which the following is a specification.

This invention relates to bicycle attachments and more particularly to combined baggage and tandem attachments for motor cycles.

The principal object of the invention is the provision of simple and efficient means which may be conveniently and readily attached to the ordinary motor cycle for converting the same into a tandem and which may be used as a baggage carrier.

A further object of the invention is the provision of a device of this character which may be readily adjusted for different heights of persons and which may be simply and readily converted from a baggage carrier into a tandem attachment.

Further objects of the invention will appear as the following specific description is read in connection with the accompanying drawings, which form a part of this application, and in which:—

Figure 1 is a perspective view showing a portion of a motorcycle with the attachment mounted thereon. Fig. 2 is a perspective view of the seat used, looking from the under side. Fig. 3 is a perspective view of one of the platform springs. Fig. 4 is a perspective view of one of the connecting braces. Fig. 5 is a detail perspective view of one of the connecting braces looking from the inside. Fig. 6 is a perspective view of one end of the platform brace. Fig. 7 is a sectional and perspective view of a portion of the main frame of the attachment. Fig. 8 is a detail section on the line 8—8 of Fig. 1.

In the specific embodiment of the invention, as illustrated herein, a portion of the motor cycle has been shown, the parts indicated being the seat post bar 1, the rear forks 2, rear fork stays 3, a portion of the rear wheel 4, and the rear axle 5. These parts are old and well known in the art and need no further description.

The attachment comprises a substantially U-shaped main frame, the legs 6 and 7 of which straddle the wheel 4 and are apertured adjacent their ends to receive the rear axle 5 and be clamped in position thereon by the nuts 8. The left leg 7 of the frame is laterally offset, as shown at 9, to permit the passage of the belt or chain of the machine. The ends of the legs 6 and 7, which extend beyond the axle openings, are fitted to receive the ordinary bicycle or motor cycle pedals 10 so as to provide a foot rest for the person occupying the tandem seat, as will be hereinafter described.

Pivoted to each leg 6 and 7 of the main frame, adjacent its connecting portion 11, are arms 12, each of which is constructed of separate parts 13 and 14, the former carrying at its end a bolt 15 which is mounted in a slot 16 in the part 14. This latter part 14 terminates in a clamping finger 17 which coacts with a similar finger 18 secured to the part 14 by means of the pivot stud 19 and the bolt 20. The end of the member 14, adjacent the slot 16 and beyond said slot, is bifurcated, as shown at 21, and the ends bend around the bar, as shown at 22, so as to prevent lateral separation of the parts.

The bolt 15 on each arm is adapted to adjustably engage apertures 23 in the depending ends of a bail-shaped support 24 to the upper horizontal portion of which are secured two coil springs 24' which correspond with similar springs 25 secured to the connecting portion 11 of the main frame. Mounted upon these springs is a platform 26 which comprises a substantially rectangular frame having its sides and ends connected by crossed bars 27 riveted together at their intersections. To this platform may be secured any type of package, by means of straps or any other suitable manner, and it will be noticed that by means of the bolt 15 the platform may be adjusted vertically or toward and away from the seat of the motor cycle, the main frame pivoting upon the axle 8. Further vertical and horizontal adjustment may be secured by moving the clamping members 17 and 18 upon the rear fork stays.

The baggage platform may be conveniently converted into a tandem attachment by the application of the seat illustrated in Fig. 2. This seat consists of a base board 28 which is suitably upholstered and is provided with projecting bolts 29 which are adapted to pass through the openings formed by the cross bars 27 and to clamp a plate 30 against the under side thereof. All that is necessary to remove the attachment from the cycle frame is to loosen the bolt 20 and the nuts 8 upon the rear axle 5.

Having thus described the invention what I claim as new is:—

1. A bicycle attachment comprising a frame adapted to straddle the wheel of the bicycle and attach to the axle thereof, longitudinally adjustable bracing arms extending between the frame and the fork stays of the bicycle, a package carrier adjustably connected to the arms and to the frame, and pedal extensions on the frame.

2. A bicycle attachment comprising a U-shaped frame adapted to attach to opposite sides of the rear axle of the bicycle, longitudinally adjustable arms connecting the frame and the fork stays of the bicycle, a supporting member adjustably connected to the arms, a platform resiliently mounted upon the supporting member and the frame, and a seat adapted to be attached to the platform.

3. An attachment for bicycles comprising a substantially U-shaped frame adapted to straddle the rear wheel of the machine and attach to the axle thereof, bracing arms pivoted to the frame and adjustably connected to the fork stays of the machine, said bracing arms being longitudinally adjustable, a support adjustably connected to the bracing arms, springs carried by the support and by the frame, an open work platform secured to the springs, a seat mounted upon and removable from the platform, extensions on the frame, and foot pedals carried upon the extensions.

In testimony whereof I affix my signature in presence of two witnesses.

BERT L. HOWELL.

Witnesses:
W. T. HENDERSON,
BUELL H. SNYDER.